(12) United States Patent
Kanno et al.

(10) Patent No.: US 10,443,474 B2
(45) Date of Patent: Oct. 15, 2019

(54) EXHAUST EMISSION CONTROL SYSTEM

(71) Applicant: Mazda Motor Corporation, Aki-gun, Hiroshima (JP)

(72) Inventors: Masanobu Kanno, Hiroshima (JP); Takayuki Yamaguchi, Hatsukaichi (JP); Masayuki Tetsuno, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 47 days.

(21) Appl. No.: 15/864,414

(22) Filed: Jan. 8, 2018

(65) Prior Publication Data

US 2018/0209316 A1    Jul. 26, 2018

(30) Foreign Application Priority Data

Jan. 23, 2017 (JP) .................................. 2017-009368

(51) Int. Cl.
*F01N 3/20* (2006.01)
*F01N 3/08* (2006.01)
(Continued)

(52) U.S. Cl.
CPC ........... *F01N 3/208* (2013.01); *F01N 3/0814* (2013.01); *F01N 3/0842* (2013.01);
(Continued)

(58) Field of Classification Search
CPC .... F01N 3/0814; F01N 3/0842; F01N 3/2066; F01N 3/208; F01N 9/00; F01N 2430/06;
(Continued)

(56) References Cited

U.S. PATENT DOCUMENTS

2017/0074191 A1*  3/2017  Kim ................... F02D 41/0235

FOREIGN PATENT DOCUMENTS

JP          2008121596 A       5/2008

* cited by examiner

*Primary Examiner* — Brandon D Lee
(74) *Attorney, Agent, or Firm* — Alleman Hall Creasman & Tuttle LLP

(57) ABSTRACT

An exhaust emission control system is provided, which includes a $NO_x$ storage catalyst provided in an exhaust passage of an engine and configured to store $NO_x$, a urea SCR catalyst provided in the exhaust passage, downstream of the $NO_x$ storage catalyst, and a $NO_x$ reduction controlling module configured to set a $NO_x$ reduction condition and, when the $NO_x$ reduction condition is satisfied, performs $NO_x$ reduction processing in which an air-fuel ratio of exhaust gas is set to be one of near a stoichiometric air-fuel ratio and rich, and the $NO_x$ stored in the $NO_x$ storage catalyst is reduced, the $NO_x$ reduction condition being set looser for the $NO_x$ reduction processing performed the first time after the engine is started than the $NO_x$ reduction processing performed the second and subsequent times after the engine is started.

4 Claims, 7 Drawing Sheets

(51) Int. Cl.
*F01N 9/00* (2006.01)
*F02D 41/02* (2006.01)
*F02D 41/06* (2006.01)
*F02D 41/14* (2006.01)
*F02D 41/40* (2006.01)

(52) U.S. Cl.
CPC ............. *F01N 3/2066* (2013.01); *F01N 9/00* (2013.01); *F02D 41/0245* (2013.01); *F02D 41/0275* (2013.01); *F01N 2430/06* (2013.01); *F01N 2610/02* (2013.01); *F01N 2900/08* (2013.01); *F01N 2900/1602* (2013.01); *F01N 2900/1614* (2013.01); *F01N 2900/1811* (2013.01); *F02D 41/064* (2013.01); *F02D 41/146* (2013.01); *F02D 41/405* (2013.01); *F02D 2200/0802* (2013.01); *F02D 2200/0806* (2013.01); *Y02T 10/24* (2013.01); *Y02T 10/26* (2013.01); *Y02T 10/47* (2013.01)

(58) Field of Classification Search
CPC ............. F01N 2610/02; F01N 2900/08; F01N 2900/1602; F01N 2900/1614; F01N 2900/1811; F02D 41/0245; F02D 41/0275; F02D 2200/0802; F02D 2200/0806; F02D 41/064; F02D 41/146; F02D 41/405; Y02T 10/24; Y02T 10/26; Y02T 10/47
See application file for complete search history.

EXHAUST EMISSION CONTROL SYSTEM

TECHNICAL FIELD

The present disclosure relates an exhaust emission control system.

BACKGROUND OF THE DISCLOSURE

Recently, emission regulations on $NO_x$ contained in exhaust gas of diesel engines have been tightened. While gasoline engines broadly adopt three-way catalysts for purifying $NO_x$, the three-way catalysts do not have a high purification performance unless engine combustion is conducted at a stoichiometric air-fuel ratio. Therefore, diesel engines, where engine combustion is conducted at a lean air-fuel ratio, do not adopt the three-way catalysts.

As an exhaust emission control system for such a diesel engine, it is known to use a $NO_x$ Storage Catalyst (NSC) for storing $NO_x$ and a urea Selective Catalytic Reduction (SCR) catalyst for detoxifying $NO_x$ by causing a chemical reaction of $NO_x$ with ammonia, in combination with each other. Since the urea SCR catalyst exhibits higher purification efficiency than that of the NSC within a high temperature range, by using the two catalysts in combination, $NO_x$ is efficiently purified over a wide range of temperature.

Although the storage ability of the NSC degrades as the $NO_x$ stored amount increases, it is restorable by bringing the air-fuel ratio of the exhaust gas close to (near) the stoichiometric air-fuel ratio or to be rich, and reducing the stored $NO_x$ ($NO_x$ reduction processing). The storage ability of the NSC also degrades when a catalyst temperature is low, e.g., immediately after an engine start (cold start). Therefore, for example, JP2008-121596A discloses a conventional exhaust emission control system in which, when a catalyst temperature and a storage ability are low immediately after the engine start, $NO_x$ reduction processing is performed as quickly as possible so as to secure the storage ability of the NSC.

However, when the $NO_x$ stored amount of the NSC is small, the $NO_x$ reduction processing performed immediately after the engine start does not sufficiently improve the storage ability, and since the $NO_x$ reduction processing requires bringing the air-fuel ratio of the exhaust gas close to the stoichiometric air-fuel ratio or to be rich, fuel consumption inconveniently increases.

Meanwhile, the urea SCR catalyst does not require $NO_x$ reduction processing. Therefore, with the exhaust emission control system using the NSC and the urea SCR catalyst in combination, by raising the catalyst temperature to the high temperature range where the purification efficiency of the urea SCR catalyst is high, the frequency of performing the $NO_x$ reduction processing immediately after the engine start is reduced. Thus, an increase in fuel consumption is prevented.

SUMMARY OF THE DISCLOSURE

The present disclosure is made in view of the above situations and aims to provide an exhaust emission control system that prevents fuel consumption from increasing while securing a purification efficiency of $NO_x$.

According to one aspect of the present disclosure, an exhaust emission control system is provided, which includes a $NO_x$ storage catalyst provided in an exhaust passage of an engine and configured to store $NO_x$, a urea SCR catalyst provided in the exhaust passage downstream of the $NO_x$ storage catalyst, and a processor configured to execute a $NO_x$ reduction controlling module to set a $NO_x$ reduction condition and, when the $NO_x$ reduction condition is satisfied, perform $NO_x$ reduction processing in which an air-fuel ratio of exhaust gas is set to be one of near a stoichiometric air-fuel ratio and rich, and the $NO_x$ stored in the $NO_x$ storage catalyst is reduced, the $NO_x$ reduction condition being set looser for the $NO_x$ reduction processing performed a first time after the engine is started, than the $NO_x$ reduction processing performed a second and subsequent times after the engine is started.

According to this configuration, the $NO_x$ reduction condition for the $NO_x$ reduction processing performed the first time after the engine start is looser than the $NO_x$ reduction processing performed the second and subsequent times after the engine start. Therefore, the $NO_x$ reduction processing performed the first time after the engine start has a higher possibility of being performed than the $NO_x$ reduction processing performed the second and subsequent times after the engine start. Thus, when the temperature of the $NO_x$ storage catalyst is low immediately after the engine start, the $NO_x$ reduction processing is performed relatively early, and as a result, the storage ability of the $NO_x$ storage catalyst is secured.

Further, with the configuration, the $NO_x$ reduction condition is not "changed," but "loosened." That is, a parameter itself which determines the $NO_x$ reduction condition is not changed. Instead, a reference value of the parameter is lowered, which means it is not the case that the $NO_x$ reduction processing is performed immediately after the engine start by changing the $NO_x$ reduction condition (or the $NO_x$ reduction processing is performed unconditionally). Therefore, unnecessary $NO_x$ reduction processing is avoided and fuel consumption is prevented from increasing.

Further, with this configuration, the urea SCR catalyst is provided downstream of the $NO_x$ storage catalyst. Thus, by performing the $NO_x$ reduction processing relatively early after the engine start as described above, heat generated by the $NO_x$ reduction processing raises the temperature of the urea SCR catalyst, and the temperature of the urea SCR catalyst rises relatively early to a temperature range within which the urea SCR catalyst exhibits a high purification efficiency. As a result, the $NO_x$ reduction processing for improving the storage ability of the $NO_x$ storage catalyst becomes unnecessary. Thus, the increase in fuel consumption is prevented.

In the exhaust emission control system, the $NO_x$ reduction condition may include a condition in which a $NO_x$ stored amount in the $NO_x$ storage catalyst is larger than a given reference stored amount. The $NO_x$ reduction controlling module may set a first stored amount that is a reference stored amount for performing the $NO_x$ reduction processing the first time after the engine is started, to be smaller than a second stored amount that is a reference stored amount for performing the $NO_x$ reduction processing the second and subsequent times after the engine is started.

According to this configuration, whether to perform the $NO_x$ reduction processing is determined based on the $NO_x$ stored amount in the $NO_x$ storage catalyst. Thus, for example, it is avoided that the $NO_x$ reduction processing is performed immediately after the engine start even though the $NO_x$ stored amount is small. As a result, the increase in fuel consumption is prevented.

In the exhaust emission control system, the processor may be further configured to execute a urea-catalyst temperature acquiring module to acquire a temperature of the urea SCR catalyst. The $NO_x$ reduction controlling module may set the first stored amount to be smaller as the acquired temperature of the urea SCR catalyst drops.

According to this configuration, when the temperature of the urea SCR catalyst is low, the first stored amount (the reference stored amount for performing the $NO_x$ reduction processing the first time after the engine start) is set to be small, that is, setting is conducted so that the $NO_x$ reduction processing is readily performed. Therefore, when the temperature of the urea SCR catalyst is low, the $NO_x$ reduction processing is performed more promptly and the temperature of the urea SCR catalyst promptly reaches the temperature range within which the urea SCR catalyst exhibits high purification efficiency. As a result, the frequency of performing the $NO_x$ reduction processing after the engine start is reduced and the increase in fuel consumption is prevented.

In the exhaust emission control system, the $NO_x$ reduction condition may include a condition in which a $NO_x$ stored amount in the $NO_x$ storage catalyst is larger than a given reference stored amount and the engine operates within a given reduction-allowed operating range determined based on an engine speed and an engine load. The $NO_x$ reduction controlling module may set a first operating range that is a reduction-allowed operating range for performing the $NO_x$ reduction processing the first time after the engine is started, to be wider than a second operating range that is a reduction-allowed operating range for performing the $NO_x$ reduction processing the second and subsequent times after the engine is started.

Also with this configuration, the $NO_x$ reduction processing performed the first time after the engine start has a higher possibility of being performed than the $NO_x$ reduction processing performed the second and subsequent times after the engine start. Thus, when the temperature of the $NO_x$ storage catalyst is low immediately after the engine start, the $NO_x$ reduction processing is performed relatively early, and as a result, the storage ability of the $NO_x$ storage catalyst is secured.

In the exhaust emission control system, the $NO_x$ reduction controlling module may set the first operating range by expanding the second operating range toward at least one of a higher engine speed side and a higher engine load side.

Originally, when an engine speed or load is high, a temperature inside a cylinder of the engine tends to be high, and under such a situation, if the $NO_x$ reduction processing is performed and an air-fuel ratio becomes close to a stoichiometric air-fuel ratio or rich, smoke and HC (hydrocarbon) may be generated. However, in a situation where the $NO_x$ reduction processing has not been performed even once, e.g., immediately after the engine start, the temperature inside the cylinder is low, and the smoke and HC generation does not easily occur. Therefore, the first operating range may be wider toward at least one of the higher engine speed side and the higher engine load side compared to the second operating range.

In the exhaust emission control system, the processor may be further configured to execute a urea-catalyst temperature acquiring module to acquire a temperature of the urea SCR catalyst. The $NO_x$ reduction controlling module may set the first operating range to be wider as the acquired temperature of the urea SCR catalyst drops.

According to this configuration, when the temperature of the urea SCR catalyst is low, the first operating range (the reduction-allowed operating range for performing the $NO_x$ reduction processing the first time after the engine start) is set to be wider, that is, setting is conducted so that the $NO_x$ reduction processing is readily performed. Therefore, when the temperature of the urea SCR catalyst is low, the $NO_x$ reduction processing is performed more promptly and the temperature of the urea SCR catalyst promptly reaches the temperature range within which the urea SCR catalyst exhibits the high purification efficiency. As a result, the frequency of performing the $NO_x$ reduction processing after the engine start is reduced and the increase in fuel consumption is prevented.

In the exhaust emission control system, the $NO_x$ reduction controlling module may set the air-fuel ratio of the exhaust gas to be one of near the stoichiometric air-fuel ratio and rich when a temperature of the $NO_x$ storage catalyst is higher than a $NO_x$-catalyst purification start temperature and a temperature of the urea SCR catalyst is lower than a switching temperature at which a $NO_x$ purification rate of the $NO_x$ storage catalyst becomes higher than a $NO_x$ purification rate of the urea SCR catalyst.

In the exhaust emission control system, the $NO_x$ reduction controlling module may set the air-fuel ratio of the exhaust gas to be one of near the stoichiometric air-fuel ratio and rich by performing a post injection of fuel on expansion stroke of the engine.

DETAILED DESCRIPTION OF THE DISCLOSURE

First Embodiment

Figure 1:
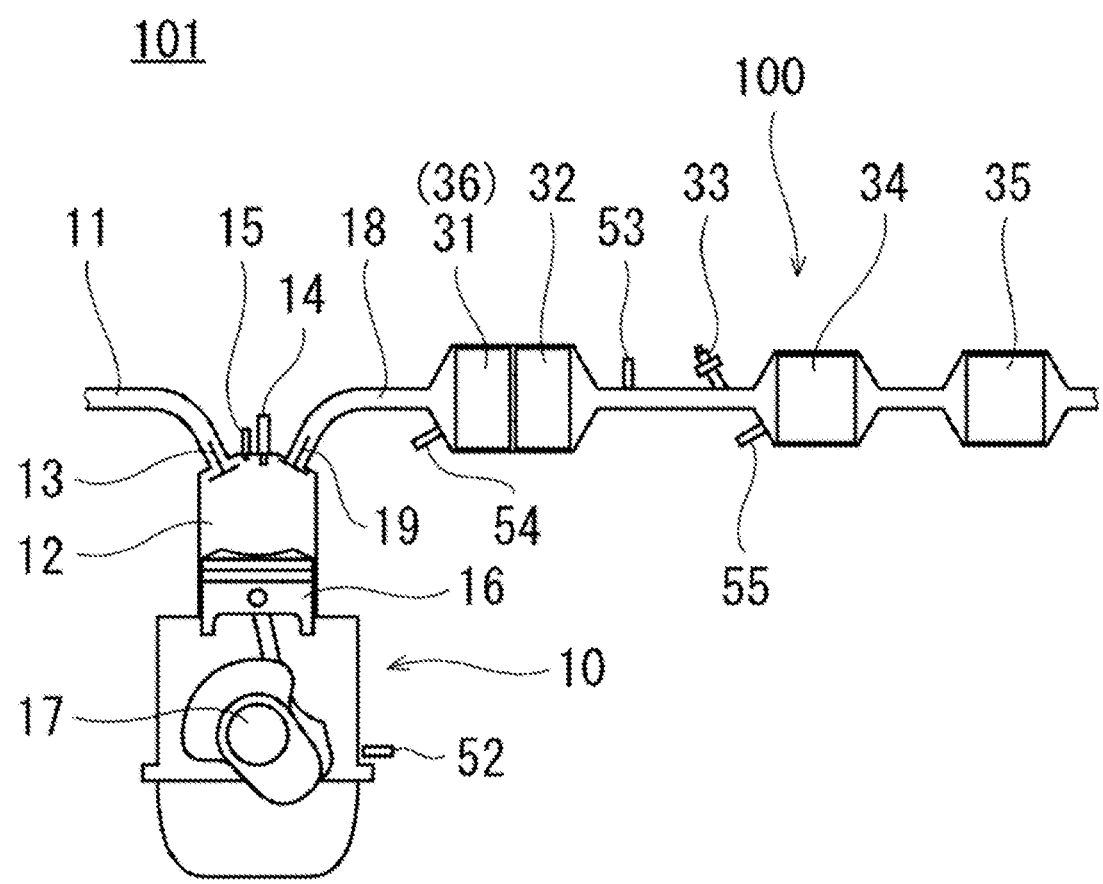
FIG. 1 is a schematic view of an engine system.

First, an exhaust emission control system according to a first embodiment is described.
<Overall Configuration>
First, an overall configuration of the exhaust emission control system is described. FIG. 1 is a schematic view of an engine system 101 including the exhaust emission control system 100.

An engine 10 of this embodiment is a diesel engine mounted on a vehicle, and includes an intake valve 13 configured to introduce intake air supplied from an intake passage 11 into a combustion chamber 12, a fuel injector 14 configured to inject fuel into the combustion chamber 12, a glowplug 15 provided in the combustion chamber 12 with a heat generating part which generates heat when energized, a piston 16 configured to reciprocate by combustion of a mixture gas in the combustion chamber 12, a crankshaft 17 configured to rotate by the reciprocation of the piston 16, and an exhaust valve 19 configured to discharge exhaust gas generated by the combustion of the mixture gas in the combustion chamber 12 to an exhaust passage 18.

The exhaust emission control system 100 purifies hazardous components contained within the exhaust gas discharged from the engine 10, and includes a $NO_x$ storage catalyst 31, a Diesel Particulate Filter (DPF) 32, a urea injector 33, a urea SCR catalyst 34, and an ammonia slip catalyst 35, which are all provided in the exhaust passage 18.

The $NO_x$ storage catalyst 31 stores (occludes) $NO_x$ within the exhaust gas when an air-fuel ratio of the exhaust gas is lean (larger than a stoichiometric air-fuel ratio), and reduces the stored $NO_x$ when the air-fuel ratio of the exhaust gas is near the stoichiometric air-fuel ratio or rich (smaller than the stoichiometric air-fuel ratio). Note that ammonia is generated when the $NO_x$ storage catalyst 31 reduces the stored $NO_x$. The storage ability of the $NO_x$ storage catalyst 31 degrades as the $NO_x$ stored amount increases. Therefore, when the $NO_x$ stored amount increases over a given amount, a $NO_x$ reduction controlling module 43 (described later) performs $NO_x$ reduction processing in which the air-fuel ratio of the exhaust gas is brought close to the stoichiometric air-fuel ratio or to be rich and the stored $NO_x$ is reduced. Thus, the storage ability of the $NO_x$ storage catalyst 31 is restored.

Further, the $NO_x$ storage catalyst 31 is integrally formed with a Diesel Oxidation Catalyst (DOC) 36 configured to oxidize hydrocarbon (HC), carbon monoxide (CO), etc. using oxygen within the exhaust gas, so as to convert it into water and carbon dioxide. For example, a catalyst material of the $NO_x$ storage catalyst 31 is coated on a surface of a catalyst material layer of the DOC 36.

The DPF 32 is provided downstream of the $NO_x$ storage catalyst 31. The DPF 32 collects Particulate Matter (PM) within the exhaust gas.

The urea injector 33 is provided downstream of the DPF 32. The urea injector 33 injects urea water between the DPF 32 and the urea SCR catalyst 34 in the exhaust passage 18. Note that an amount of urea water injected by the urea injector 33 and a timing of the injection are controlled by a control device 40 described later.

The urea SCR catalyst 34 is provided downstream of the urea injector 33. The urea SCR catalyst 34 hydrolyzes the urea injected by the urea injector 33 to generate ammonia and causes this ammonia and the ammonia generated by the $NO_x$ storage catalyst 31 to react with $NO_x$ within the exhaust gas to purify the $NO_x$ (i.e., reduces $NO_x$).

The ammonia slip catalyst 35 is provided downstream of the urea SCR catalyst 34. The ammonia slip catalyst 35 oxidizes and purifies ammonia released from (slipped through) the urea SCR catalyst 34.

Figure 2:
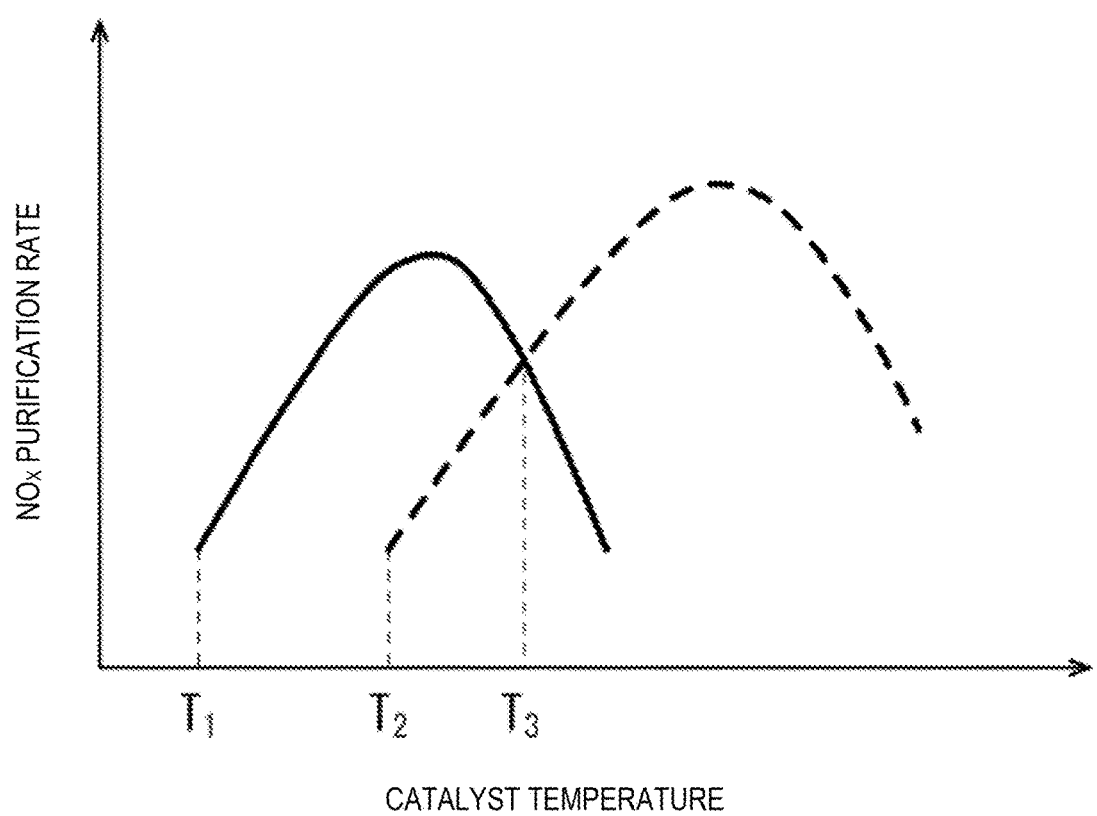
FIG. 2 is a chart illustrating relationships between a catalyst temperature and a $NO_x$ purification rate for a $NO_x$ storage catalyst and a urea SCR catalyst.

Here, although both of the $NO_x$ storage catalyst 31 and the urea SCR catalyst 34 described above purify $NO_x$, temperature ranges where their $NO_x$ purification rates ($NO_x$ purification efficiency) are high are different. FIG. 2 is a chart illustrating relationships between the catalyst temperature and the $NO_x$ purification rate for the $NO_x$ storage catalyst 31 and the urea SCR catalyst 34. In FIG. 2, the horizontal axis is the catalyst temperature and the vertical axis is the $NO_x$ purification rate. Further, the solid line is a graph for the $NO_x$ storage catalyst 31, and the broken line is a graph for the urea SCR catalyst 34.

As illustrated in FIG. 2, it becomes possible for the $NO_x$ storage catalyst 31 to purify $NO_x$ when the catalyst temperature reaches an NSC purification start temperature ($NO_x$-catalyst purification start temperature) $T_1$. As the catalyst temperature rises, the $NO_x$ purification rate increases accordingly, and after the $NO_x$ purification rate reaches a highest value, the $NO_x$ purification rate decreases as the catalyst temperature rises. Similarly, it becomes possible for the urea SCR catalyst 34 to purify $NO_x$ when the catalyst temperature reaches an SCR purification start temperature $T_2$. As the catalyst temperature rises, the $NO_x$ purification rate increases accordingly, and after the $NO_x$ purification rate reaches a highest value, the $NO_x$ purification rate decreases as the catalyst temperature rises.

Here, the graph for the urea SCR catalyst 34 is offset from the graph for the $NO_x$ storage catalyst 31 to the higher catalyst temperature side. That is, the urea SCR catalyst 34 has a higher $NO_x$ purification rate than the $NO_x$ storage catalyst 31 within a high temperature range. Further, with a switching temperature $T_3$ as a boundary, the $NO_x$ purification rate of the $NO_x$ storage catalyst 31 is higher than that of the urea SCR catalyst 34 when the catalyst temperature is lower than the switching temperature $T_3$. Moreover, the $NO_x$ purification rate of the urea SCR catalyst 34 is higher than that of the $NO_x$ storage catalyst 31 when the catalyst temperature is higher than the switching temperature $T_3$. In other words, the switching temperature $T_3$ is a catalyst temperature at which the $NO_x$ purification rate of the $NO_x$ storage catalyst 31 and the $NO_x$ purification rate of the urea SCR catalyst 34 reverse.

Thus, since the exhaust emission control system 100 of this embodiment uses the $NO_x$ storage catalyst 31 and the urea SCR catalyst 34 in combination, $NO_x$ is efficiently purified over a wide temperature range. Note that when the catalyst temperature exceeds the switching temperature $T_3$, since the $NO_x$ purification rate of the urea SCR catalyst 34 are high, the $NO_x$ reduction processing for improving the storage ability of the $NO_x$ storage catalyst 31 becomes unnecessary, and thus, fuel consumption is reduced.

<Configuration of Electric System>

Figure 3:
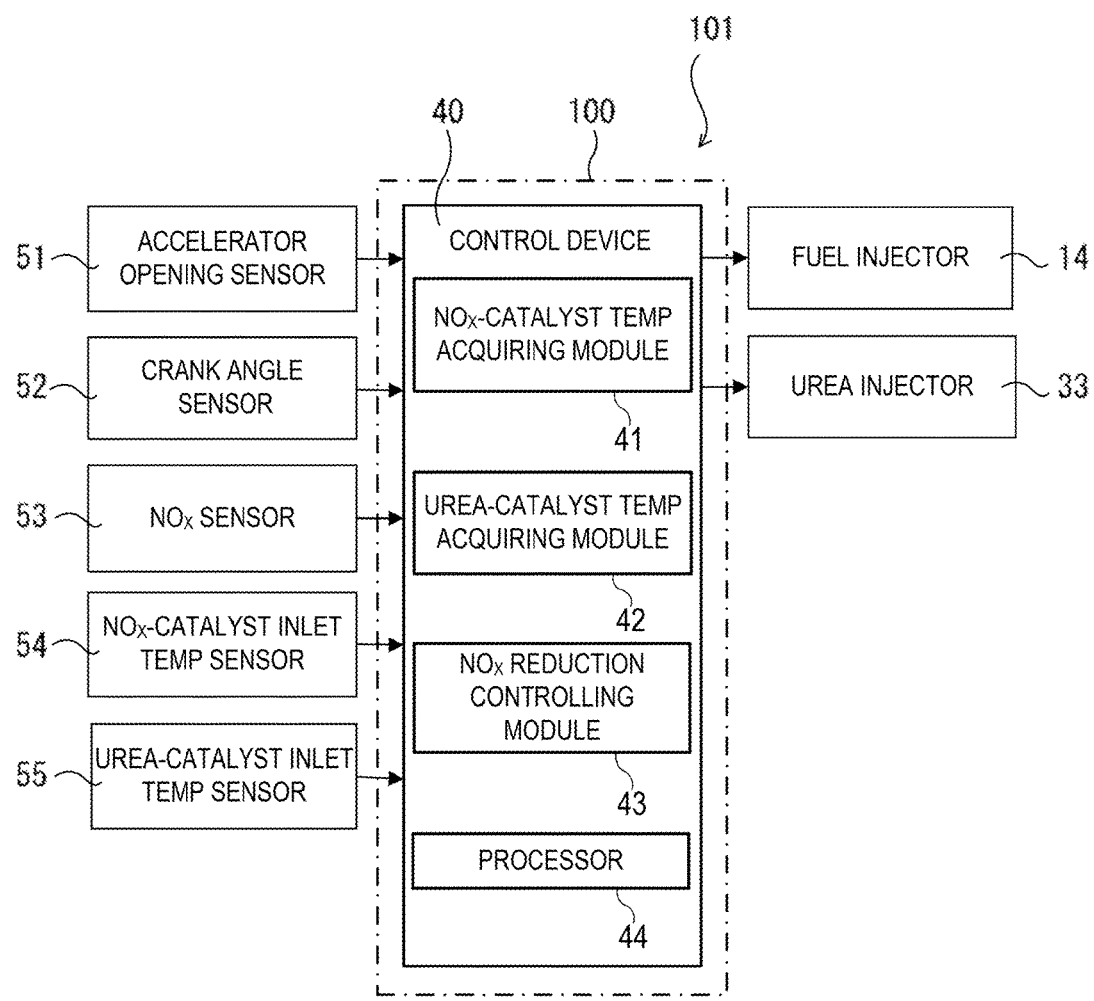
FIG. 3 is a block diagram of an electric system configuration of an engine system.

Next, an electric system configuration of the exhaust emission control system 100 is described. FIG. 3 is a block diagram of the electric system configuration of the engine system 101 including the exhaust emission control system 100. The exhaust emission control system 100 includes the control device 40 comprised of a processor 44 (e.g. a central processing unit (CPU)), RAM(s), ROM(s), etc.

The control device 40 is electrically connected to an accelerator opening sensor 51 configured to detect an accelerator opening, a crank angle sensor 52 configured to detect a crank angle, a $NO_x$ sensor 53 configured to measure a $NO_x$ concentration within the exhaust gas flowing into the urea SCR catalyst 34, a $NO_x$-catalyst inlet temperature sensor 54 configured to measure a temperature of the exhaust gas flowing into the $NO_x$ storage catalyst 31, and a urea-catalyst inlet temperature sensor 55 configured to measure a temperature of the exhaust gas flowing into the urea SCR catalyst 34. The control device 40 acquires various kinds of information based on signals received from these sensors and performs various calculations based on the acquired information.

Further, the control device 40 is electrically connected to the fuel injector 14 and the urea injector 33, and transmits control signals to these components based on various calculation results. As a basic control of the engine 10, the control device 40 mainly determines a target torque (target load) based on an engine speed and the accelerator opening, and performs a fuel injection (main injection) by the fuel injector 14 near a top dead center on compression stoke (CTDC) to generate the target torque. Note that the engine speed is calculated based on the signal received from the crank angle sensor 52. Further, with only the main injection, the air-fuel ratio of the exhaust gas becomes lean.

The control device 40 includes a $NO_x$-catalyst temperature acquiring module 41, a urea-catalyst temperature acquiring module 42, and the $NO_x$ reduction controlling module 43 as a functional configuration. The processor 44 is configured to execute the $NO_x$-catalyst temperature acquiring module 41, the urea-catalyst temperature acquiring module 42, and the $NO_x$ reduction controlling module 43 to perform their respective functions. These modules are stored in the internal memory as one or more software programs.

The $NO_x$-catalyst temperature acquiring module 41 acquires the temperature of the $NO_x$ storage catalyst 31. The temperature of the $NO_x$ storage catalyst 31 is substantially the same as the temperature of the exhaust gas flowing into the $NO_x$ storage catalyst 31. Therefore, the $NO_x$-catalyst temperature acquiring module 41 of this embodiment acquires the temperature of the $NO_x$ storage catalyst 31 based on the measurement signal received from the $NO_x$-catalyst inlet temperature sensor 54. Note that the $NO_x$-catalyst temperature acquiring module 41 may acquire the temperature of the $NO_x$ storage catalyst 31 by calculating it from an operation model of the engine 10.

The urea-catalyst temperature acquiring module 42 acquires the temperature of the urea SCR catalyst 34. The temperature of the urea SCR catalyst 34 is substantially the same as the temperature of the exhaust gas flowing into the urea SCR catalyst 34. Therefore, the urea-catalyst temperature acquiring module 42 of this embodiment acquires the temperature of the urea SCR catalyst 34 based on the measurement signal received from the urea-catalyst inlet temperature sensor 55. Note that the urea-catalyst temperature acquiring module 42 may acquire the temperature of the urea SCR catalyst 34 by calculating it from an operation model of the engine 10.

The $NO_x$ reduction controlling module 43 executes a $NO_x$ reduction control. For example, the $NO_x$ reduction controlling module 43 sets a $NO_x$ reduction condition and, when the set $NO_x$ reduction condition is satisfied, performs the $NO_x$ reduction processing in which the air-fuel ratio of the exhaust gas is brought close to the stoichiometric air-fuel ratio or to be rich, and $NO_x$ stored in the $NO_x$ storage catalyst is reduced. The $NO_x$ reduction processing of this embodiment is performed by the $NO_x$ reduction controlling module 43 transmitting a control signal to the fuel injector 14, and the fuel injector 14 performing a post injection which does not contribute to fuel combustion (generates no torque) on expansion stroke. By performing the post injection in addition to the main injection described above, remaining fuel which is not combusted is mixed with the exhaust gas, and the air-fuel ratio of the exhaust gas becomes close to the stoichiometric air-fuel ratio or rich.

Note that although in this embodiment the $NO_x$ reduction processing is performed by the post injection of the fuel injector 14, alternatively, the air-fuel ratio of the exhaust gas may be brought close to the stoichiometric air-fuel ratio or to be rich by directly injecting the fuel into the exhaust passage 18 so as to perform the $NO_x$ reduction processing.

<$NO_x$ Reduction Control>

Figure 4:
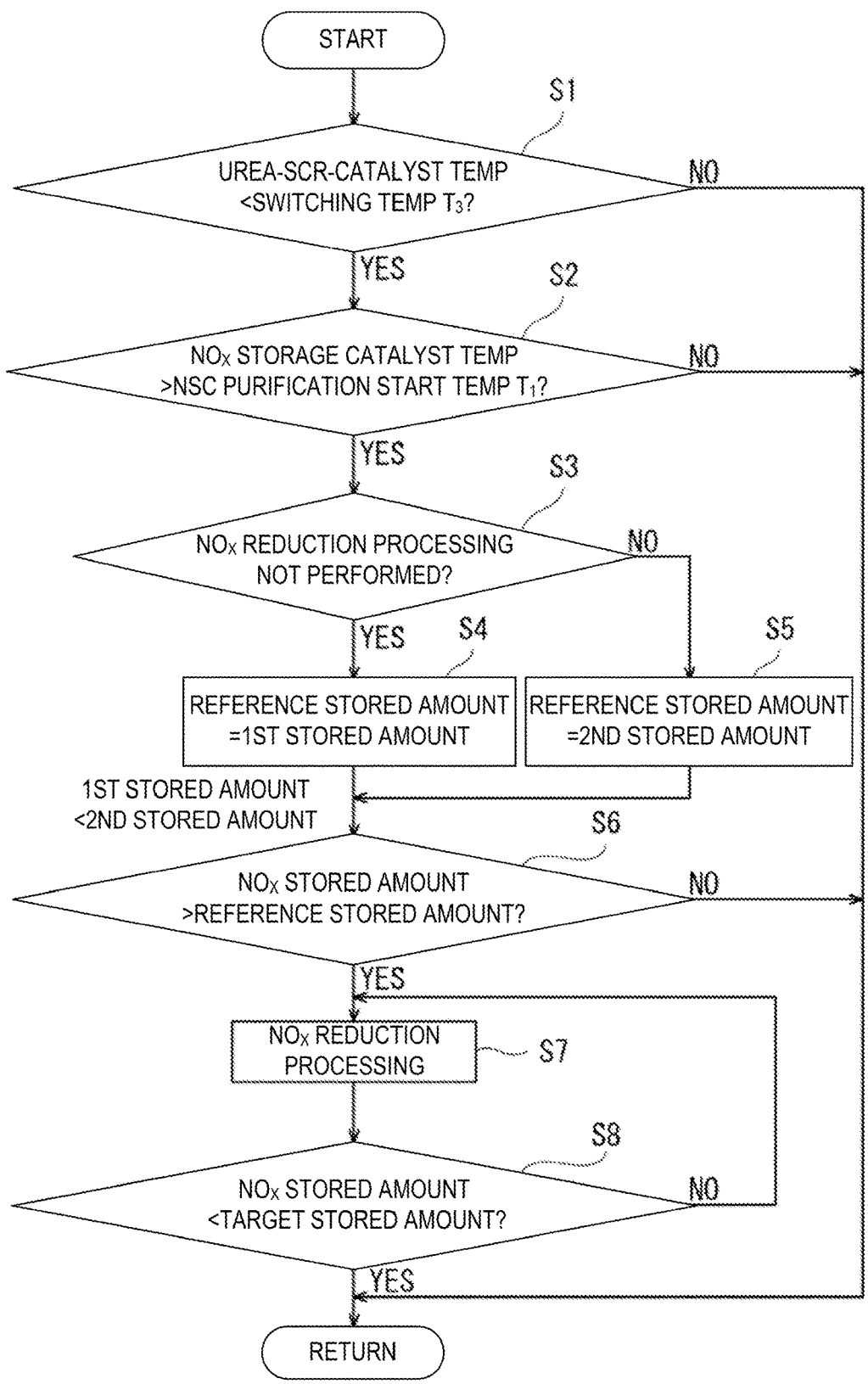
FIG. 4 is a flowchart of a $NO_x$ reduction control according to a first embodiment.

Next, the $NO_x$ reduction control is described in more detail. FIG. 4 is a flowchart of the $NO_x$ reduction control. This $NO_x$ reduction control is executed by the $NO_x$ reduction controlling module 43.

The $NO_x$ reduction control begins accompanying the start of the engine 10 (cold start). Once the $NO_x$ reduction control is started, the $NO_x$ reduction controlling module 43 determines whether the temperature of the urea SCR catalyst 34 is lower than the switching temperature $T_3$ (S1). Note that the temperature of the urea SCR catalyst 34 is acquired by the urea-catalyst temperature acquiring module 42 as described above. The switching temperature $T_3$ is a temperature at which the $NO_x$ purification rate of the $NO_x$ storage catalyst 31 and the $NO_x$ purification rate of the urea SCR catalyst 34 reverse (see FIG. 2). Note that other temperatures may be used instead of the switching temperature $T_3$ at S1.

If the temperature of the urea SCR catalyst 34 is lower than the switching temperature $T_3$ (S1: YES), the process proceeds to S2. On the other hand, if the temperature of the urea SCR catalyst 34 is higher than the switching temperature $T_3$ (S1: NO), the process returns to S1 without performing the $NO_x$ reduction processing. This is due to when the temperature of the urea SCR catalyst 34 is higher than the switching temperature $T_3$, since the purification efficiency of the urea SCR catalyst 34 is high, there is no need to perform the $NO_x$ reduction processing to improve the storage ability of the $NO_x$ storage catalyst 31.

Subsequently, at S2, the $NO_x$ reduction controlling module 43 determines whether the temperature of the $NO_x$ storage catalyst 31 is higher than the NSC purification start temperature $T_1$. Note that the temperature of the $NO_x$ storage catalyst 31 is acquired by the $NO_x$-catalyst temperature acquiring module 41 as described above. Further, the NSC purification start temperature $T_1$ is a temperature at which the $NO_x$ purification by the $NO_x$ storage catalyst 31 becomes possible (see FIG. 2). When the temperature of the $NO_x$ storage catalyst 31 is higher than the NSC purification start temperature $T_1$ (S2: YES), the process proceeds to S3.

On the other hand, if the temperature of the $NO_x$ storage catalyst 31 is lower than the NSC purification start temperature $T_1$ (S2: NO), since the $NO_x$ stored in the $NO_x$ storage catalyst 31 cannot be reduced even with the $NO_x$ reduction processing, the process returns to S1 without performing the $NO_x$ reduction processing. Note that other temperatures may be used instead of the NSC purification start temperature $T_1$ at S2.

Subsequently, at S3, the $NO_x$ reduction controlling module 43 determines whether the $NO_x$ reduction processing has not been performed even once since the start of the $NO_x$ reduction control. Although the processing of S1 to S8 is repeated once the $NO_x$ reduction control is started, if the process at S7 (described later) has not been performed since the start of the $NO_x$ reduction control, this means that the $NO_x$ reduction processing has not been performed.

If the $NO_x$ reduction processing has not been performed since the start of the $NO_x$ reduction control (S3: YES), the $NO_x$ reduction controlling module 43 sets a reference stored amount that is used to determine whether to perform the $NO_x$ reduction processing, to a first stored amount (S4). On the other hand, if the $NO_x$ reduction processing has been performed since the start of the $NO_x$ reduction control (S3: NO), the reference stored amount is set to a second stored amount (S5). The first and second stored amounts are different values, the first stored amount is smaller than the second stored amount, and both of them are fixed values.

Subsequently, at S6, the $NO_x$ reduction controlling module 43 determines whether the $NO_x$ stored amount is larger than the reference stored amount which is set at S4 or S5. As described above, the first stored amount, which is the reference stored amount when the $NO_x$ reduction processing has not been performed since the start of the $NO_x$ reduction control, is smaller than the second stored amount which is the reference stored amount when the $NO_x$ reduction processing has been performed since the start of the $NO_x$ reduction control. Therefore, when the $NO_x$ reduction processing has not been performed since the start of the $NO_x$ reduction control, it is easier to satisfy the condition of S6 compared with when the $NO_x$ reduction processing has been performed since the start of the $NO_x$ reduction control.

Note that in this embodiment, the $NO_x$ stored amount of the $NO_x$ storage catalyst 31 is acquired by correcting, with the $NO_x$ concentration measured by the $NO_x$ sensor 53, the value calculated from the operation model of the engine 10. Note that a $NO_x$ sensor may be provided on both the upstream side and the downstream side of the $NO_x$ storage catalyst 31 so that the $NO_x$ stored amount is calculated based on a difference between the $NO_x$ concentrations measured by the both sensors.

Subsequently, if the $NO_x$ stored amount is larger than the reference stored amount (S6: YES), the $NO_x$ reduction processing is performed (S7). On the other hand, if the $NO_x$ stored amount is smaller than the reference stored amount (S6: NO), the process returns to S1 without performing the $NO_x$ reduction processing.

After performing the $NO_x$ reduction processing at S7, the $NO_x$ reduction controlling module 43 determines whether the $NO_x$ stored amount is smaller than a target stored amount (S8). When the $NO_x$ stored amount is smaller than the target stored amount (S8: YES), the process returns to S1. On the other hand, when the $NO_x$ stored amount is larger than the target stored amount (S8: NO), the process returns to S7 to repeat the $NO_x$ reduction processing until the $NO_x$ stored amount falls below the target stored amount. Thus, the storage ability of the $NO_x$ storage catalyst 31 is restored.

<Operations and Effects>

As described at S3, S4 and S5, the $NO_x$ reduction controlling module 43 of this embodiment sets the first stored amount, which is the reference stored amount for performing the $NO_x$ reduction processing the first time after the engine start (first $NO_x$ reduction processing), to be smaller than the second stored amount for performing the $NO_x$ reduction processing the second and subsequent times after the engine start (second $NO_x$ reduction processing). That is, the $NO_x$ reduction controlling module 43 sets the $NO_x$ reduction condition for performing the first $NO_x$ reduction processing to be looser than the $NO_x$ reduction condition for performing the second and subsequent $NO_x$ reduction processing.

Therefore, the first $NO_x$ reduction processing has a higher possibility of being performed than the second $NO_x$ reduction processing. Thus, even when the temperature of the $NO_x$ storage catalyst is low immediately after the engine start, the $NO_x$ reduction processing is performed relatively early, and as a result, the storage ability of the $NO_x$ storage catalyst 31 is secured.

Further, in this embodiment, when comparing the case of performing the first $NO_x$ reduction processing and the case of performing the second $NO_x$ reduction processing, the $NO_x$ stored amount itself of the $NO_x$ storage catalyst 31, which is a parameter for determining whether to perform the $NO_x$ reduction processing, is not changed, whereas the reference stored amount which is a reference value of the parameter is lowered from the second stored amount to the first stored amount. In other words, in this embodiment, it is not the case that the $NO_x$ reduction processing is performed immediately after the engine start by changing the parameter itself to be different between the case of performing the first $NO_x$ reduction processing and the case of performing the second $NO_x$ reduction processing (or that the $NO_x$ reduction processing is performed unconditionally). Therefore, according to this embodiment, unnecessary $NO_x$ reduction processing is avoided and fuel consumption is prevented from increasing.

Further, as described above, when the $NO_x$ reduction processing is performed relatively early after the engine start, since the urea SCR catalyst 34 is provided downstream of the $NO_x$ storage catalyst 31 in this embodiment, heat generated by the $NO_x$ reduction processing promptly raises the temperature of the urea SCR catalyst 34. As a result, the temperature of the urea SCR catalyst 34 promptly rises to the temperature range within which the urea SCR catalyst 34 exhibits high purification efficiency, and the $NO_x$ reduction processing that improves the storage ability of the $NO_x$ storage catalyst 31 becomes unnecessary. Thus, the increase in fuel consumption after the engine start is prevented.

Therefore, according to this embodiment, the increase in fuel consumption is prevented while securing the purification performance.

<Modifications>

Figure 5:
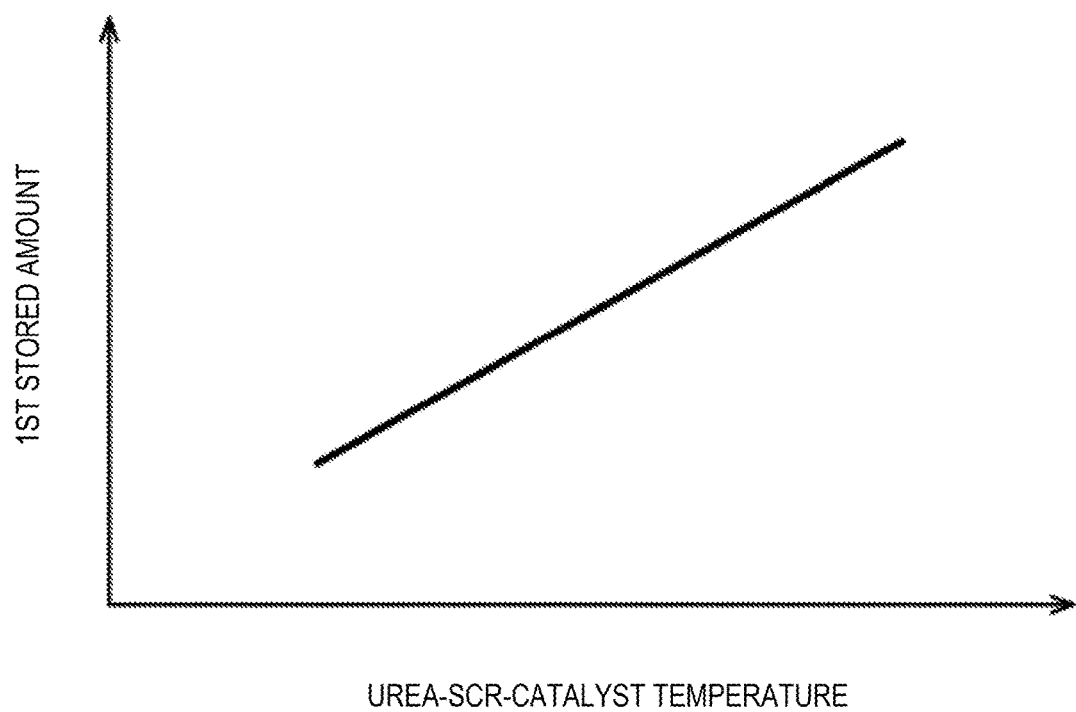
FIG. 5 is a chart illustrating a relationship between the temperature of the urea SCR catalyst and a first stored amount.

Although in the first embodiment described above the case where both the first and second stored amounts are fixed values is described, the first stored amount may be changed according to the temperature of the urea SCR catalyst 34. For example, as illustrated in FIG. 5, the first stored amount may be set to be larger as the temperature of the urea SCR catalyst 34 rises and smaller as the temperature of the urea SCR catalyst 34 drops. Note that FIG. 5 is a chart illustrating a relationship between the temperature of the urea SCR catalyst 34 and the first stored amount, in which the horizontal axis indicates the catalyst temperature and the vertical axis indicates the first stored amount.

According to this configuration, when the temperature of the urea SCR catalyst 34 is low, since the first stored amount is set small, the $NO_x$ reduction processing is performed more promptly, and the temperature of the urea SCR catalyst 34 reaches more promptly the temperature range within which the urea SCR catalyst 34 exhibits high purification efficiency. As a result, the frequency of performing the $NO_x$ reduction processing after the engine start is reduced and the increase in fuel consumption is prevented. Note that the second stored amount may similarly be changed according to the temperature of the urea SCR catalyst 34.

Second Embodiment

Next, the exhaust emission control system 100 according to a second embodiment is described. In the second embodiment, the $NO_x$ reduction condition in the $NO_x$ reduction control is different from that in the first embodiment. Except for this, the exhaust emission control system 100 of the second embodiment basically has the same configuration as that of the exhaust emission control system 100 of the first embodiment. Therefore, hereinafter, the $NO_x$ reduction control in the second embodiment is mainly described, and the description of the overall configuration of the exhaust emission control system 100 and the configuration of the electric system is omitted.

<$NO_x$ Reduction Control>

Figure 6:
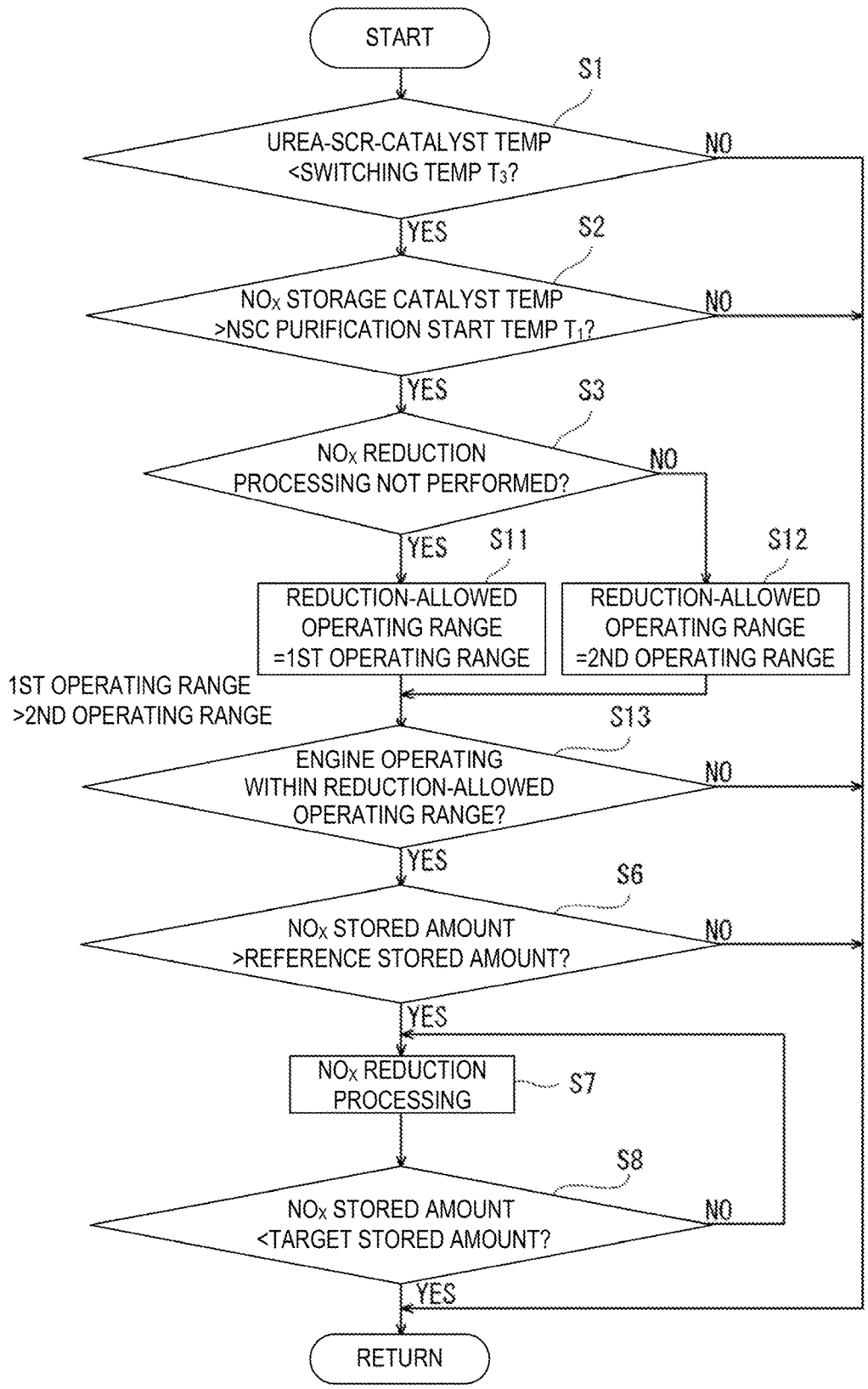
FIG. 6 is a flowchart of a $NO_x$ reduction control according to a second embodiment.

FIG. 6 is a flowchart of a $NO_x$ reduction control according to the second embodiment. As is clear from the comparison between FIGS. 4 and 6, the $NO_x$ reduction control of the second embodiment does not include S4 and S5 in the $NO_x$ reduction control of the first embodiment, but includes S11, S12, and S13 instead.

When the $NO_x$ reduction control is started, the $NO_x$ reduction controlling module 43 determines whether the temperature of the urea SCR catalyst 34 is lower than the switching temperature $T_3$ (S1). If the temperature of the urea SCR catalyst 34 is lower than the switching temperature $T_3$ (S1: YES), the process proceeds to S2. On the other hand, if the temperature of the urea SCR catalyst 34 is higher than the switching temperature $T_3$ (S1: NO), the process returns to S1 without performing the $NO_x$ reduction processing.

Subsequently, at S2, the $NO_x$ reduction controlling module 43 determines whether the temperature of the $NO_x$ storage catalyst 31 is higher than the NSC purification start temperature $T_1$. If the temperature of the $NO_x$ storage catalyst 31 is higher than the NSC purification start temperature $T_1$ (S2: YES), the process proceeds to S3. On the other hand, if the temperature of the $NO_x$ storage catalyst 31 is lower than the NSC purification start temperature $T_1$ (S2: NO), the process returns to S1 without performing the $NO_x$ reduction processing.

Subsequently, at S3, the $NO_x$ reduction controlling module 43 determines whether the $NO_x$ reduction processing has not been performed even once since the start of the $NO_x$ reduction control. If the $NO_x$ reduction processing has not been performed since the start of the $NO_x$ reduction control (S3: YES), the $NO_x$ reduction controlling module 43 sets a reduction-allowed operating range to a first operating range (S11). If the $NO_x$ reduction processing has been performed after the start of the $NO_x$ reduction control (S3: NO), the $NO_x$ reduction controlling module 43 sets the reduction-allowed operating range to a second operating range (S12).

Figure 7:
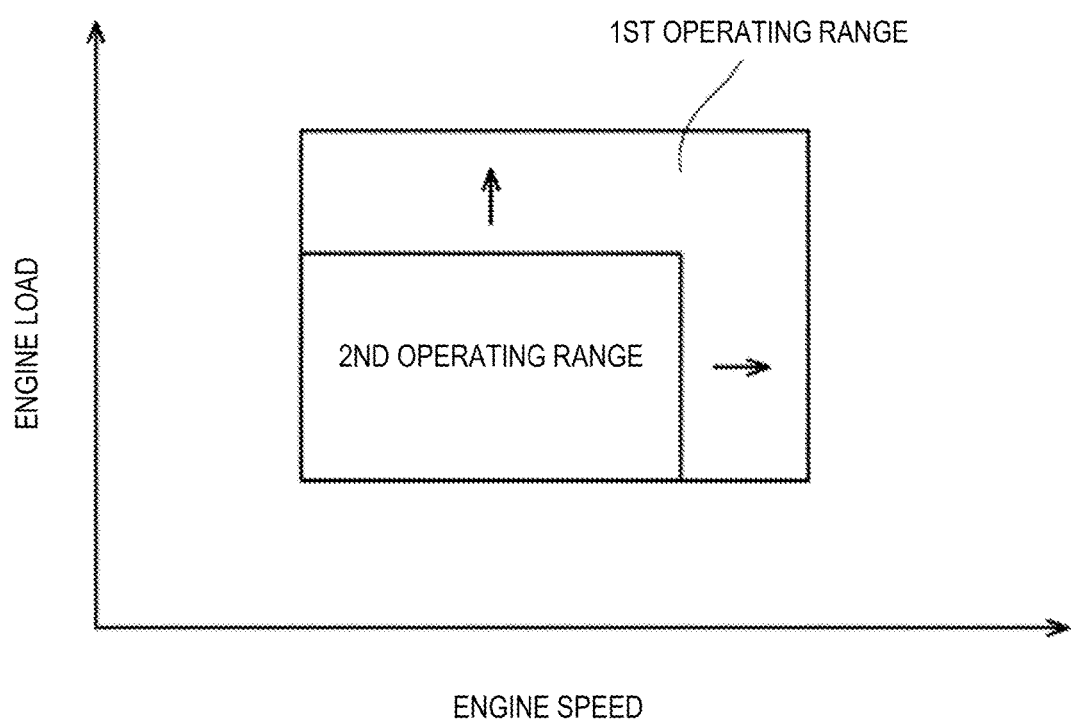
FIG. 7 is a chart illustrating a reduction-performable operating range of the engine within which $NO_x$ reduction processing is performable.

As illustrated in FIG. 7, each of the first and second operating ranges which are set as the reduction-allowed operating range is an operating range of the engine 10 determined based on the engine speed and the engine load, and the first operating range is wider than the second operating range. Further, both the first and second operating ranges are fixed.

Here, in this embodiment, the $NO_x$ reduction processing is performed when the condition that the engine 10 operates within a given operating range (reduction-allowed operating range) is satisfied. This is because, if the $NO_x$ reduction processing is performed when the engine 10 operates at a low speed/load, since the temperature of the $NO_x$ storage catalyst 31 is low, $NO_x$ cannot sufficiently be reduced and the fuel injected in the post injection may not suitably be combusted and cause a misfire. Additionally, if the $NO_x$ reduction processing is performed when the engine 10 operates at a high speed/load, the post injection is performed while a temperature inside a cylinder of the engine is high, i.e., ignition occurs before the fuel and air are suitably mixed, which may generate smoke and HC.

On the other hand, the temperature inside the cylinder is still low immediately after the start of the $NO_x$ reduction control which is immediately after the engine start. Therefore, even if the reduction-allowed operating range when the $NO_x$ reduction processing has not been performed after the start of the $NO_x$ reduction control (first operating range) is expanded to the higher speed and load sides, smoke and HC generation by the $NO_x$ reduction processing does not easily occur. Therefore, in this embodiment, as illustrated in FIG. 7, the first operating range is set by expanding the second operating range to the higher engine speed side and the higher engine load side.

Subsequently, at S13, the $NO_x$ reduction controlling module 43 determines whether the engine 10 operates within the reduction-allowed operating range set at S11 or S12. As described above, the first operating range, which is the reduction-allowed operating range when the $NO_x$ reduction processing has not been performed after the start of the $NO_x$ reduction control, is wider than the second operating range which is the reduction-allowed operating range when the $NO_x$ reduction processing has been performed after the start of the $NO_x$ reduction control. Therefore, when the $NO_x$ reduction processing has not been performed since the start of the $NO_x$ reduction control, it is easier to satisfy the condition of S13 compared with when the $NO_x$ reduction processing has been performed since the start of the $NO_x$ reduction control.

At S13, if the engine 10 operates within the reduction-allowed operating range (S13: YES), the process proceeds to S6. On the other hand, if the engine 10 does not operate within the reduction-allowed operating range (S13: NO), the process returns to S1 without performing the $NO_x$ reduction processing.

Subsequently, at S6, the $NO_x$ reduction controlling module 43 determines whether the $NO_x$ stored amount is larger than the reference stored amount. In this embodiment, different from the first embodiment, the reference stored amount is constant regardless of whether the $NO_x$ reduction processing has been performed. Note that the reference stored amount may vary depending on whether the $NO_x$ reduction processing has been performed as in the first embodiment.

Subsequently, if the $NO_x$ stored amount is larger than the reference stored amount (S6: YES), the $NO_x$ reduction processing is performed (S7). On the other hand, if the $NO_x$ stored amount is smaller than the reference stored amount (S6: NO), the process returns to S1 without performing the $NO_x$ reduction processing.

After performing the $NO_x$ reduction processing at S7, the $NO_x$ reduction controlling module 43 determines whether the $NO_x$ stored amount is smaller than the target stored amount (S8), and the $NO_x$ reduction processing is repeated until the $NO_x$ stored amount becomes smaller than the target stored amount.

<Operations and Effects>

As described at S3, S11 and S12, the $NO_x$ reduction controlling module 43 of this embodiment sets the first operating range, which is the reduction-allowed operating range for performing the first $NO_x$ reduction processing, to be wider than the second operating range which is the reduction-allowed operating range for performing the second $NO_x$ reduction processing is performed. In other words, also in this embodiment, the $NO_x$ reduction controlling module 43 sets the $NO_x$ reduction condition for performing the first $NO_x$ reduction processing, to be looser than the $NO_x$ reduction condition for performing the second $NO_x$ reduction processing.

Therefore, also with the exhaust emission control system 100 of the second embodiment, the first $NO_x$ reduction processing has a higher possibility of being performed than the second $NO_x$ reduction processing. Thus, even when the temperature of the $NO_x$ storage catalyst is low immediately after the engine start, the $NO_x$ reduction processing is performed relatively early, and as a result, the storage ability of the $NO_x$ storage catalyst is secured.

Further, in this embodiment, when comparing the case of performing the first $NO_x$ reduction processing and the case of performing the second $NO_x$ reduction processing, the reduction-allowed operating range itself, which is a parameter for determining whether to perform the $NO_x$ reduction processing, is not changed, whereas the reference value (range) of the parameter is expanded from the second operating range to the first operating range. In other words, also in this embodiment, it is not that the $NO_x$ reduction processing is performed immediately after the engine start by changing the parameter itself to be different between the case of performing the first $NO_x$ reduction processing and the case of performing the second $NO_x$ reduction processing (or the $NO_x$ reduction processing is not performed unconditionally). Therefore, according to this embodiment, unnecessary $NO_x$ reduction processing is avoided and fuel consumption is prevented from increasing.

Further, as described above, when the $NO_x$ reduction processing is performed relatively early after the engine start, since in this embodiment the urea SCR catalyst 34 is provided downstream of the $NO_x$ storage catalyst 31 similarly to the first embodiment, heat generated by the $NO_x$ reduction processing promptly raises the temperature of the urea SCR catalyst 34. As a result, the temperature of the urea SCR catalyst 34 promptly rises to the temperature range within which the urea SCR catalyst 34 exhibits the high purification efficiency, and the $NO_x$ reduction processing which improves the storage ability of the $NO_x$ storage catalyst 31 becomes unnecessary. Thus, the increase in fuel consumption after the engine start is prevented.

Therefore, according to this embodiment, the increase in fuel consumption is prevented while securing the purification performance.

<Modifications>

Although in the second embodiment described above the case where both the first and second operating ranges are fixed is described, the first operating range may be changed according to the temperature of the urea SCR catalyst 34. For example, the first operating range may be set to be narrower as the temperature of the urea SCR catalyst 34 rises and wider as the temperature of the urea SCR catalyst 34 drops.

According to this configuration, when the temperature of the urea SCR catalyst 34 is low, since the first operating range is set to be wide, the $NO_x$ reduction processing is performed more promptly, and the temperature of the urea SCR catalyst 34 reaches more promptly the temperature range within which the urea SCR catalyst 34 exhibits the high purification efficiency. As a result, the frequency of performing the $NO_x$ reduction processing after the engine start is reduced and the increase in fuel consumption is prevented. Note that the second operating range may similarly be changed according to the temperature of the urea SCR catalyst 34.

Note that in the second embodiment described above, the case where the $NO_x$ reduction controlling module 43 sets the first operating range by expanding the second operating range to the higher engine speed side and the higher engine load side (see FIG. 7) is described. Alternatively, the $NO_x$ reduction controlling module 43 may set the first operating range by expanding the second operating range only to the higher engine speed side or only to the higher engine load side. In either case, the first $NO_x$ reduction processing has a higher possibility of being performed than the second $NO_x$ reduction processing.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

10 Engine
18 Exhaust Passage
31 $NO_x$ Storage Catalyst
34 Urea SCR Catalyst
40 Control Device
42 Urea-catalyst Temperature Acquiring Module
43 $NO_x$ Reduction Controlling Module
100 Exhaust Emission Control System

What is claimed is:

1. An exhaust emission control system, comprising:
a fuel injector;
a $NO_x$ storage catalyst provided in an exhaust passage of an engine and configured to store $NO_x$;
a urea selective catalytic reduction (SCR) catalyst provided in the exhaust passage downstream of the $NO_x$ storage catalyst; and
a processor operatively coupled to the fuel injector and configured to execute a $NO_x$ reduction controlling module to set a $NO_x$ reduction condition and, when the processor determines that the $NO_x$ reduction condition is satisfied, control the fuel injector to perform $NO_x$ reduction processing in which an air-fuel ratio of exhaust gas is set to be one of near a stoichiometric air-fuel ratio and rich, and the $NO_x$ stored in the $NO_x$ storage catalyst is reduced, wherein
the $NO_x$ reduction condition includes a condition in which a $NO_x$ stored amount in the $NO_x$ storage catalyst is larger than a given reference stored amount and the engine operates within a given reduction-allowed operating range determined based on an engine speed and an engine load,
the $NO_x$ reduction controlling module sets a first operating range that is a reduction-allowed operating range for performing the $NO_x$ reduction processing a first time after the engine is started, to be larger than a second operating range that is a reduction-allowed operating range for performing the $NO_x$ reduction processing a second and subsequent times after the engine is started, and
the $NO_x$ reduction controlling module sets the first operating range by expanding the second operating range toward at least one of a higher engine speed side and a higher engine load side.

2. The exhaust emission control system of claim 1, wherein
the processor is further configured to execute a urea-catalyst temperature acquiring module to acquire a temperature of the urea SCR catalyst, and
the $NO_x$ reduction controlling module sets the first operating range to be larger as the acquired temperature of the urea SCR catalyst drops.

3. The exhaust emission control system of claim 1, wherein the $NO_x$ reduction controlling module sets the air-fuel ratio of the exhaust gas to be one of near the stoichiometric air-fuel ratio and rich when a temperature of the $NO_x$ storage catalyst is higher than a $NO_x$-catalyst purification start temperature and a temperature of the urea SCR catalyst is lower than a switching temperature at which a $NO_x$ purification rate of the $NO_x$ storage catalyst becomes higher than a $NO_x$ purification rate of the urea SCR catalyst.

4. The exhaust emission control system of claim 1, wherein the $NO_x$ reduction controlling module sets the air-fuel ratio of the exhaust gas to be one of near the stoichiometric air-fuel ratio and rich by performing a post injection of fuel on expansion stroke of the engine.

* * * * *